(12) United States Patent
Zisler

(10) Patent No.: US 11,251,674 B2
(45) Date of Patent: Feb. 15, 2022

(54) COOLING APPARATUS FOR LINEAR MOTOR WITH IMPROVED SEALING

(71) Applicant: Siemens Aktiengesellschaft, Munich (DE)

(72) Inventor: Michael Zisler, Euerdorf-Wirmsthal (DE)

(73) Assignee: Siemens Aktiengesellschaft, Munich (DE)

( * ) Notice: Subject to any disclaimer, the term of this patent is extended or adjusted under 35 U.S.C. 154(b) by 71 days.

(21) Appl. No.: 16/862,198

(22) Filed: Apr. 29, 2020

(65) Prior Publication Data

US 2020/0350799 A1    Nov. 5, 2020

(30) Foreign Application Priority Data

Apr. 30, 2019 (EP) ..................... 19171793

(51) Int. Cl.
   *H02K 5/10*    (2006.01)
   *H02K 5/22*    (2006.01)
   *H02K 41/02*   (2006.01)
   *H02K 9/00*    (2006.01)

(52) U.S. Cl.
   CPC .............. *H02K 5/10* (2013.01); *H02K 5/225* (2013.01); *H02K 9/00* (2013.01); *H02K 41/02* (2013.01)

(58) Field of Classification Search
   USPC ..................................................... 310/12.29
   See application file for complete search history.

(56) References Cited

U.S. PATENT DOCUMENTS

| | | | |
|---|---|---|---|
| 2004/0201291 | A1 | 10/2004 | Hoppe |
| 2008/0245508 | A1 | 10/2008 | Shimura et al. |
| 2010/0040448 | A1* | 2/2010 | Knorr ............... H02K 11/21 414/749.1 |
| 2018/0092250 | A1 | 3/2018 | Wang et al. |
| 2018/0175708 | A1 | 6/2018 | Fernandes Goncalves |

FOREIGN PATENT DOCUMENTS

| | | |
|---|---|---|
| DE | 194 04 642 A1 | 8/1997 |
| DE | 10 2006 017 033 A1 | 10/2007 |
| DE | 10 2016 114 507 A1 | 2/2018 |
| DE | 102016114742 A1 | 2/2018 |
| EP | 3337019 A1 | 6/2018 |
| WO | WO 03/021756 A2 | 3/2003 |

* cited by examiner

*Primary Examiner* — Tulsidas C Patel
*Assistant Examiner* — Robert E Mates
(74) *Attorney, Agent, or Firm* — Henry M. Feiereisen LLC

(57) ABSTRACT

A cooling apparatus for an electric linear motor includes a carrier element configured for placement on an active part of the electric linear motor, a cooling element, and a retaining element configured to mount the cooling element on the carrier element. The retaining element has a first planar area on a side facing the active part of the electric linear motor and a second planar area on a side facing away from the active part of the electric linear motor. The retaining element has an opening sized to extend between the first and second planar areas for passage of a fastening element. Each of the first and second planar areas has formed therein a cutout circulating around the opening, with a sealing element being received in the cutout.

13 Claims, 5 Drawing Sheets

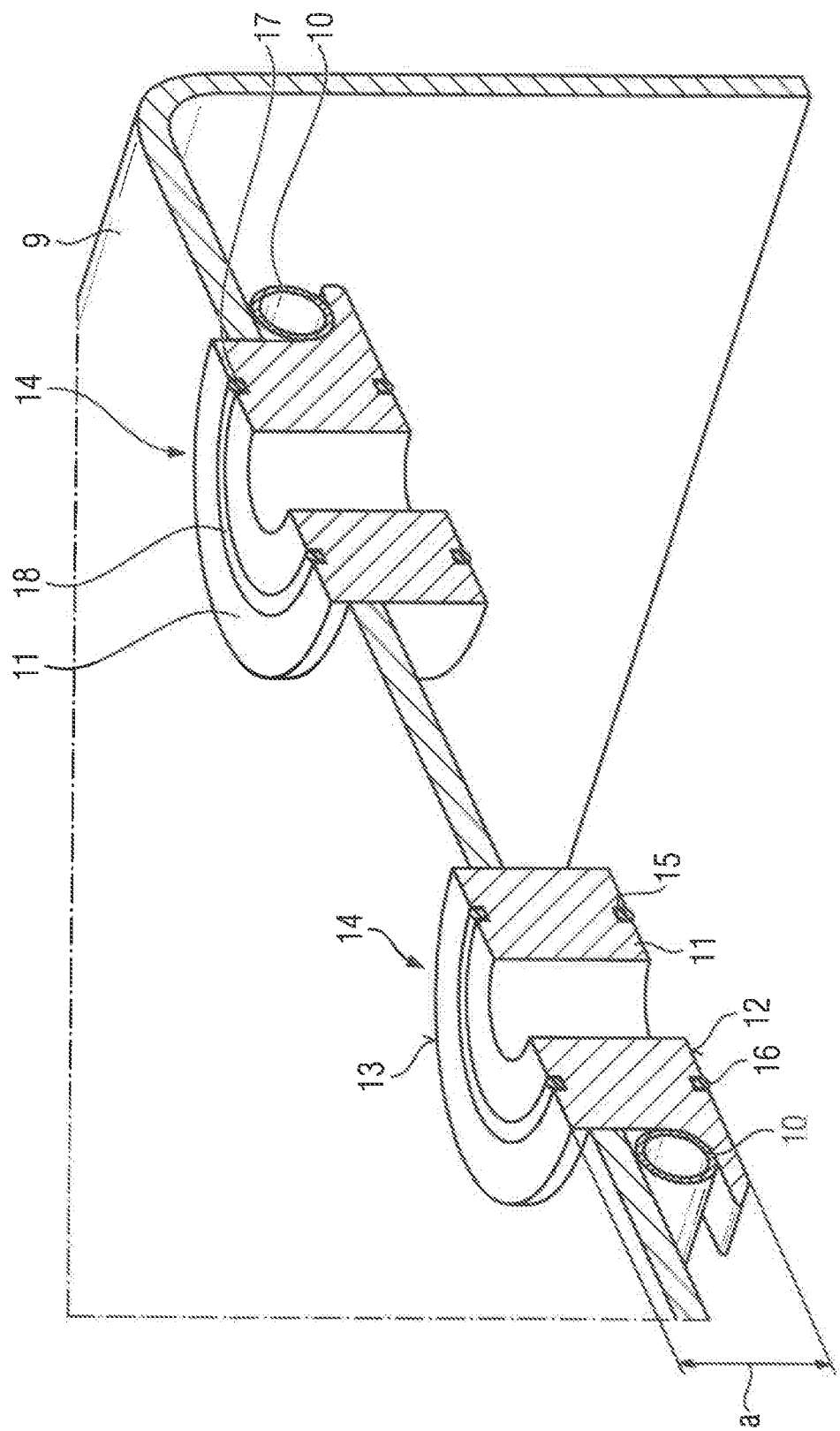

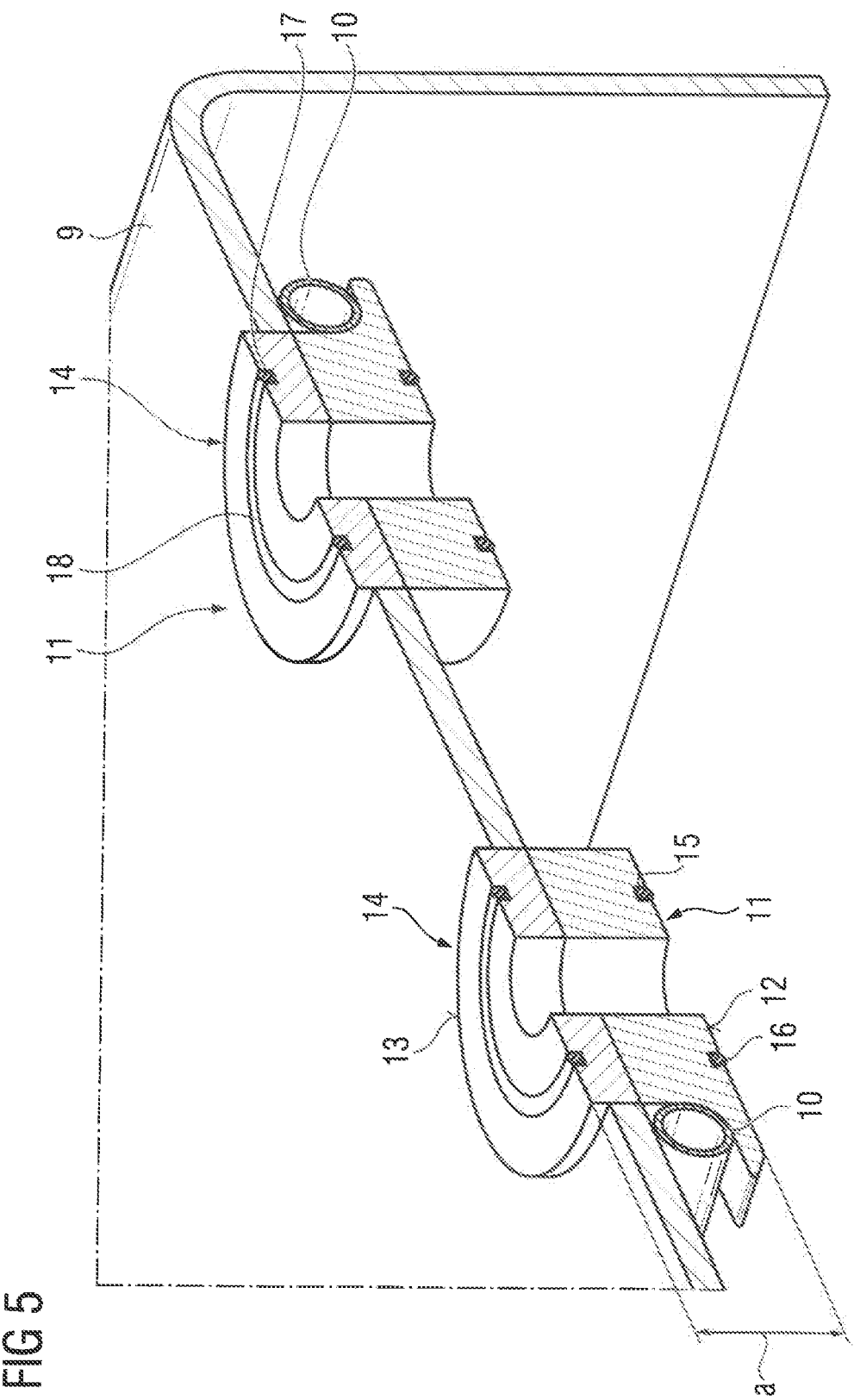

COOLING APPARATUS FOR LINEAR MOTOR WITH IMPROVED SEALING

CROSS-REFERENCES TO RELATED APPLICATIONS

This application claims the priority of European Patent Application, Serial No. 19171793.3, filed Apr. 30, 2019, pursuant to 35 U.S.C. 119(a)-(d), the disclosure of which is incorporated herein by reference in its entirety as if fully set forth herein.

BACKGROUND OF THE INVENTION

The present invention relates to a cooling apparatus for an electric linear motor.

The following discussion of related art is provided to assist the reader in understanding the advantages of the invention, and is not to be construed as an admission that this related art is prior art to this invention.

Electric linear motors are used in various applications. For instance, they are used inter alia with machine tools in order to move machine parts linearly. Their use in machine tools, but also in a number of other applications, poses the risk of liquid, including water, infiltrating the linear motor and causing short circuits there. In order to protect against short circuits of this type, the linear motor is conventionally enclosed in a relatively high level of protection, in most cases IP 65. While such an approach may appear to be sound, it still has shortcomings with respect to a cooling apparatus and interface of the cooling apparatus with the electric linear motor.

It would therefore be desirable and advantageous to address prior art shortcomings.

SUMMARY OF THE INVENTION

According to one aspect of the present invention, a cooling apparatus for an electric linear motor includes a carrier element configured for placement on an active part of the electric linear motor, a cooling element, a retaining element configured to mount the cooling element on the carrier element and having a first planar area on a side facing the active part of the electric linear motor and a second planar area on a side facing away from the active part of the electric linear motor, the retaining element having an opening sized to extend between the first and second planar areas for passage of a fastening element, with each of the first and second planar areas having formed therein a cutout circulating around the opening, and a sealing element received in the cutout.

As a result, it is easily possible to fasten the cooling apparatus to the active part of the linear motor and to ensure leak tightness.

According to another advantageous feature of the present invention, the retaining element can be sized to pass through the carrier element.

According to another advantageous feature of the present invention, the first and second planar areas of the retaining element can be spaced from one another by a uniform distance. As a result, the retaining element acts as spacer which adjusts a defined distance of a cover element from the active part of the electric linear motor when the cover element is placed on the cooling apparatus, for instance a carriage in the case of a machine tool, on which carriage a workpiece to be processed is retained.

Each sealing element can be embodied as required. For instance, the sealing element can be realized as sprayed or foamed sealing element. According to an advantageous feature of the present invention, the sealing element can be embodied as sealing ring which is made of a permanently elastic mass. Advantageously, the sealing ring can be embodied as O-ring.

According to another advantageous feature of the present invention, the retaining element can be fastened to the carrier element via a bayonet connection or via a locking lug. As an alternative, according to another advantageous feature of the present invention, the retaining element can include a lower part which faces the active part of the electric linear motor and an upper part which faces away from the active part of the electric linear motor, with the lower part and the upper part being fastened to one another via a bayonet connection or via a snap-on connection, and with the retaining element being held clamped to the carrier element when the lower part and the upper part are fastened to one another. Any of the afore-described configurations results in a simple and cost-effective fastening of the retaining element to the carrier element, and, at least in the case of a bayonet connection can easily be detached again.

According to another aspect of the present invention, an assembly includes an electric linear motor which includes an active part, a cooling apparatus placed on the active part and configured in accordance with the present invention as set forth above, a cover element configured for placement on the cooling apparatus, and a fastening element passing through the opening of the retaining element for fastening the cover element to the active part, so that the active part rests under pressure on the first planar area of the retaining element, and the cover element rests under pressure on the second planar area of the retaining element.

According to another advantageous feature of the present invention, the active part of the electric linear motor can be embodied as a primary part or a secondary part, with one of the primary and second parts being movable and the other one of the primary and second parts being stationary. The electric linear motor with its primary part or secondary part, together with the cooling apparatus as set forth above, a cover element and fastening elements, form the assembly in accordance with the present invention.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 4 is a perspective sectional view of the cooling apparatus of FIG. 2 obliquely from above; and FIG. 5 is a perspective sectional view of a modification of the cooling apparatus of FIG. 2 obliquely from above.

DETAILED DESCRIPTION OF PREFERRED EMBODIMENTS

Figure 1:
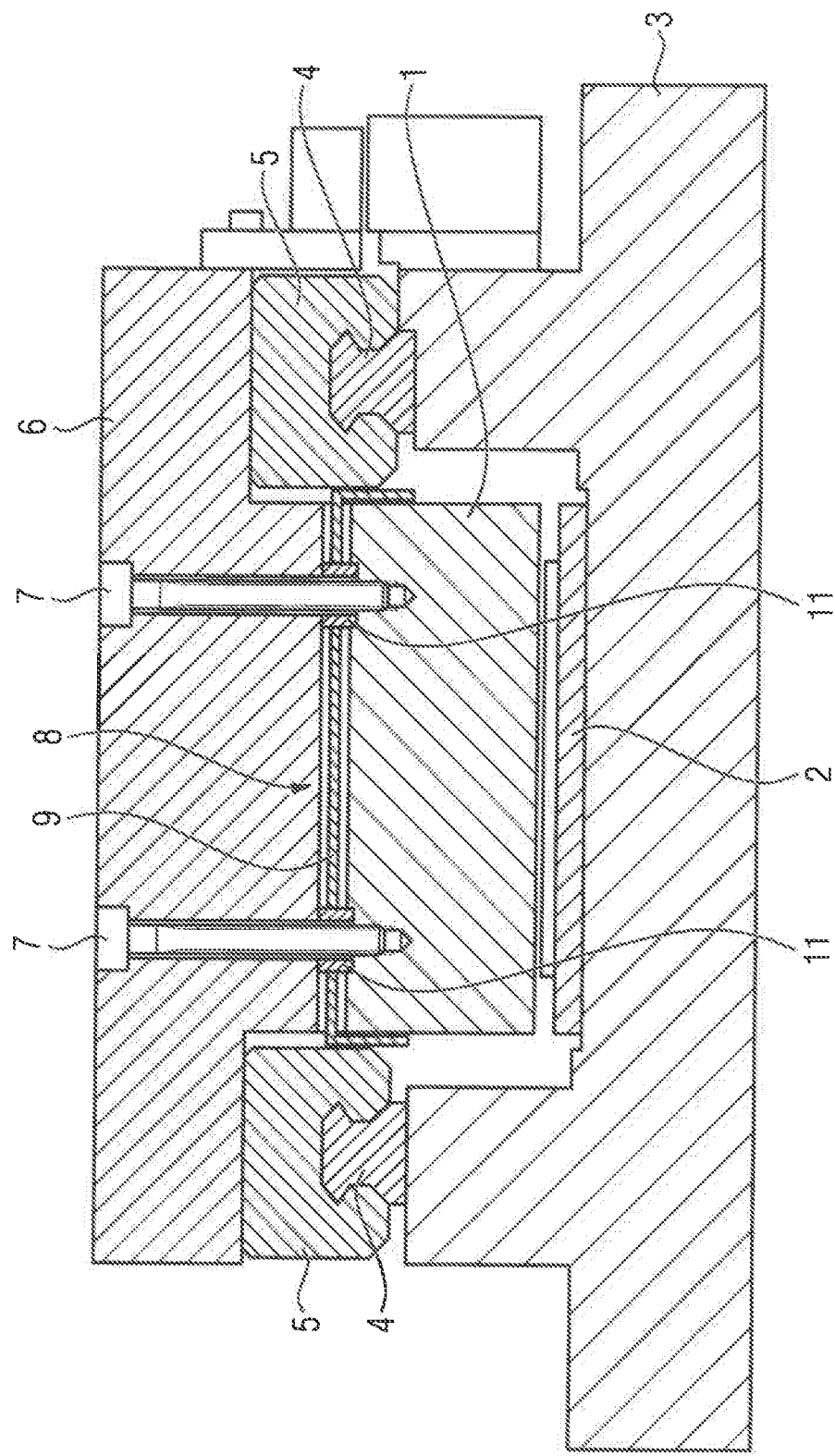
FIG. 1 is a sectional view of an electric linear motor in a machine tool in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sectional view of an electric linear motor in a machine tool in accordance with the present invention. The electric linear motor includes a primary part 1 and a secondary part 2. The primary part 1 and the secondary part 2 are the two active parts of the electric linear motor. Within the scope of FIG. 1, the electric linear motor is used in a machine tool. The present invention is however not restricted to machine tools. Instead, it can be used universally in any linear motor. Furthermore, within the scope of the present invention, the primary part 1 is the moving part of the electric linear motor, with the secondary part 2 representing the stationary part of the electric linear motor. In principle, it could, however, also be reversed. Furthermore, the present invention is explained below in conjunction with an embodiment in which the primary part 1, together with further elements as described further below, forms an assembly according to the present invention. A same configuration could in principle also be realized with a secondary part 2.

In the non-limiting example shown here, the secondary part 2 is arranged in a machine bed 3. The machine bed 3 has guide elements 4, for instance guide rails. The guide rails guide an element moving relative to the machine bed 3 in interaction with corresponding counter elements 5, for instance a carriage 6. The carriage 6 is a cover element within the meaning of the present invention.

The carriage 6 is connected to the primary part 1 by means of fastening elements 7. For this purpose, a cooling apparatus 8 is arranged between the primary part 1 and the carriage 6. The cooling apparatus 8 will be explained in greater detail below in conjunction with FIGS. 2 to 4. It should be mentioned here that the fastening elements 7 according to the illustration in FIG. 1 traverse the cooling apparatus 8 so as to press the carriage 6 (the cover element) via the cooling apparatus 8 against the primary part 1. As a result, the cooling apparatus 8 rests under pressure on the primary part 1 and the carriage 6 (the cover element) also rests under pressure on the cooling apparatus 8. The fastening elements 7 can be embodied as conventional stud bolts, for instance.

Figure 2:
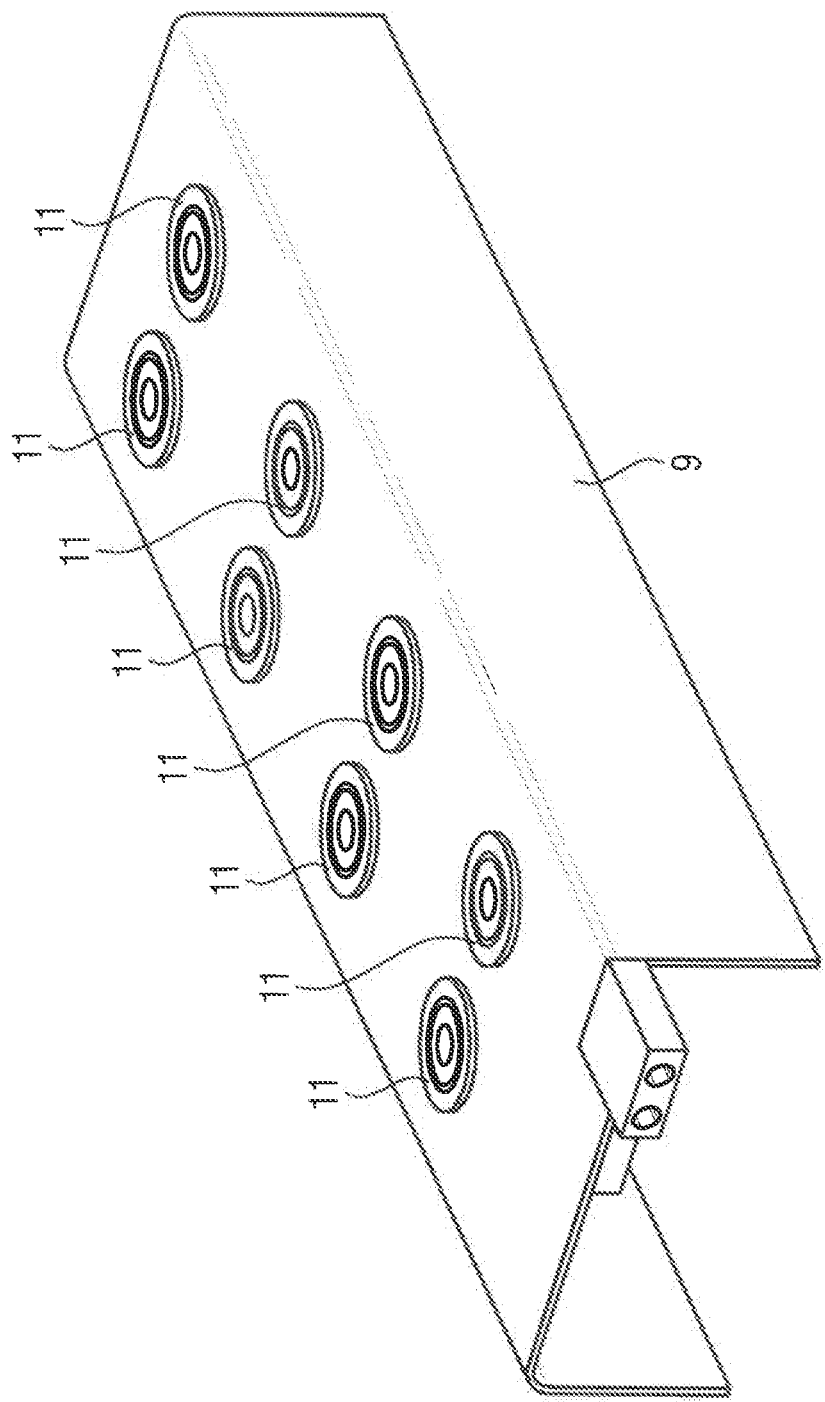
FIG. 2 is a perspective view of a cooling apparatus obliquely from above.
Figure 3:
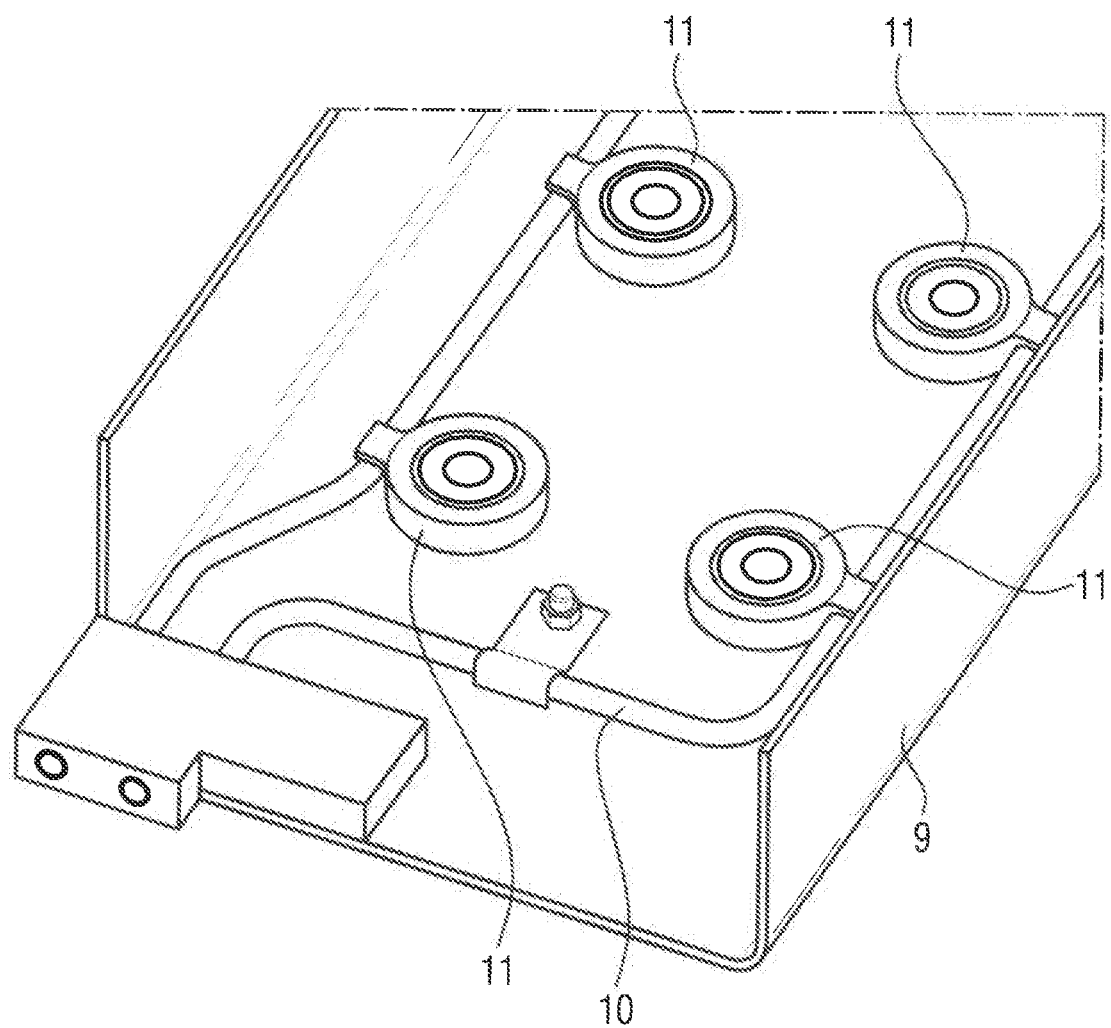
FIG. 3 is a perspective view of a part of the cooling apparatus of FIG. 2 obliquely from below.

According to FIGS. 2 to 4, the cooling apparatus 8 includes a carrier element 9. Together with other elements of the cooling apparatus 8, which elements are yet to be described further below, the carrier element 9 is placed on the primary part 1. The cooling apparatus 8 further includes at least one cooling element 10, for instance a cooling coil. The cooling element 10 is assembled on the carrier element 9 by means of retaining elements 11. For instance, it can be held in a force-fitting or form-fitting manner by the retaining elements 11.

As is readily apparent from FIG. 4, the retaining elements 11 have each an area 12 facing the primary part 1 and an area 13 facing away from the primary part 1. The two areas 12, 13 are planar. Furthermore, a respective opening 14 extends between the two planar areas 12, 13. In the assembled state, the fastening elements 7 extend through the openings 14, see FIG. 1. As a result, the retaining elements 11 pass through the carrier element 9 so that viewed in the axial extent of the openings 14, the carrier element 9 is arranged between the planar areas 12, 13. Furthermore, the planar areas 12, 13 have a distance a from one another. The distance a is normally uniform for the retaining elements 11. Furthermore, the division of the distance a is normally such that the planar areas 12 have a uniform distance from the carrier element 9, and correspondingly the planar areas 13 also have a uniform distance from the carrier element 9. The planar areas 12 therefore generally lie in a uniform plane, as are the planar areas 13.

In order to seal the primary part 1 with respect to the carrier element 9, a cutout 15 is formed in the planar area 12. The cutout 15 extends around the opening 14 of the respective retaining element 11. A sealing element 16 is placed in the cutout 15. The sealing element 16 is generally embodied as a sealing ring, which is made of a permanently elastic mass. The sealing element 16 can be embodied as an O-ring, for instance.

Likewise, a cutout 17 is introduced into the planar area 13 in order to seal the carrier element 9 with respect to the carriage 6 (the cover element). The cutout 17 also extends around the opening 14 of the respective retaining element 11. A sealing element 18 is placed in the cutout 17. The sealing element 18 is normally embodied also as a sealing ring, which is made of a permanently elastic mass. For instance, the sealing element 18 may also be embodied as an O-ring.

Furthermore, also the fastening elements 7 will normally be sealed with respect to the carriage 6 (the cover element).

In order to manufacture an assembly in accordance with the present invention, the cooling apparatus 8 is firstly placed on the primary part 1. The carriage 6 (the cover element) Is then placed on the cooling apparatus 8. The carriage 6 (the cover element) is finally fastened to the primary part 1 by means of the fastening elements 7. The fastening elements 7 pass hereby through the openings 14 of the retaining elements 11, as mentioned above in conjunction with FIG. 1. As a consequence of the pressure exerted by the fastening elements 7, the primary part 1 rests under pressure on the planar area 12 and the carriage 6 (the cover element) rests under pressure on the planar area 13.

The manner in which the retaining elements 11 are connected to the carrier element 9 can be realized as required. For instance, the retaining elements 11 can be fastened to the carrier element 9 via a bayonet connection. A fastening using locking lugs is also possible. It is also possible for the retaining elements 11 to be embodied in two parts, so that each retaining element 11 includes a lower part and an upper part, as shown in FIG. 5. The lower part faces the primary part 1 in this case, whereas the upper part faces the carriage 6 (the cover element). The lower part and the upper part may hereby be detachably fastened to one another. When the lower part and the upper part are fastened to one another, the respective retaining element 11 is held clamped to the carrier element 9. The type of connection between the respective lower part and the respective upper part with one another may also be realized as required. A connection between the lower part and the upper part via a bayonet connection or via a snap-on connection is, however, advantageous and currently preferred.

In summary, the present invention therefore relates to the following facts:

A cooling apparatus 8 for an electric linear motor has a carrier element 9 which can be placed on an active part 1 of the electric linear motor. The cooling apparatus 8 has at least one cooling element 10 mounted on the carrier element 9 by means of retaining elements 11. The retaining elements 11 have each planar areas 12, 13 on their side facing the active part 1 of the electric linear motor and on their side facing away from the active part 1 of the electric linear motor. The retaining elements 11 each have an opening 14 which extends between the two planar areas 12, 13 for passage of a fastening element 7. Cutouts 15, 17, which extend around the respective opening 14, are formed in the planar areas 12, 13, respectively, and receive each a sealing element 16, 18.

The present invention has many advantages. A liquid-tight enclosure (up to IP 67, even up to IP 68) can be realized in particular in a simple and reliable manner. A good enclosure of this type is required in particular in machine tools. Furthermore, ease of assembly is considerably increased and the costs for assembly are reduced.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

The invention claimed is:

1. A cooling apparatus for an electric linear motor, said cooling apparatus comprising:
   a carrier element configured for placement on an active part of the electric linear motor;
   a cooling element;
   a retaining element configured to mount the cooling element on the carrier element and having a first planar area on a side facing the active part of the electric linear motor and a second planar area on a side facing away from the active part of the electric linear motor, said retaining element having an opening sized to extend between the first and second planar areas for passage of a fastening element, each of the first and second planar areas having formed therein a cutout circulating around the opening; and
   a sealing element received in the cutout.

2. The cooling apparatus of claim 1, wherein the retaining element is sized to pass through the carrier element, said first and second planar areas of the retaining element being spaced from one another by a uniform distance.

3. The cooling apparatus of claim 1, wherein the sealing element is embodied as a sealing ring made of a permanently elastic mass.

4. The cooling apparatus of claim 3, wherein the sealing ring is embodied as O-ring.

5. The cooling apparatus of claim 1, wherein the retaining element is fastened to the carrier element via a bayonet connection or via a locking lug.

6. The cooling apparatus of claim 1, wherein the retaining element includes a lower part which faces the active part of the electric linear motor and an upper part which faces away from the active part of the electric linear motor, the lower part and the upper part being fastened to one another via a bayonet connection or via a snap-on connection, said retaining element being held clamped to the carrier element when the lower part and the upper part are fastened to one another.

7. An assembly, comprising:
   an electric linear motor including an active part;
   a cooling apparatus placed on the active part, said cooling apparatus comprising a carrier element configured for placement on the active part of the electric linear motor, a cooling element, a retaining element configured to mount the cooling element on the carrier element and having a first planar area on a side facing the active part of the electric linear motor and a second planar area on a side facing away from the active part of the electric linear motor, said retaining element having an opening sized to extend between the first and second planar areas for passage of a fastening element, each of the first and second planar areas having formed therein a cutout circulating around the opening, and a sealing element received in the cutout;
   a cover element configured for placement on the cooling apparatus; and
   a fastening element passing through the opening of the retaining element for fastening the cover element to the active part, so that the active part rests under pressure on the first planar area of the retaining element, and the cover element rests under pressure on the second planar area of the retaining element.

8. The assembly of claim 7, wherein the retaining element is sized to pass through the carrier element, said first and second planar areas of the retaining element being spaced from one another by a uniform distance.

9. The assembly of claim 7, wherein the sealing element is embodied as a sealing ring made of a permanently elastic mass.

10. The assembly of claim 9, wherein the sealing ring is embodied as O-ring.

11. The assembly of claim 7, wherein the retaining element is fastened to the carrier element via a bayonet connection or via a locking lug.

12. The assembly of claim 7, wherein the retaining element includes a lower part which faces the active part of the electric linear motor and an upper part which faces away from the active part of the electric linear motor, the lower part and the upper part being fastened to one another via a bayonet connection or via a snap-on connection, said retaining element being held clamped to the carrier element when the lower part and the upper part are fastened to one another.

13. The assembly of claim 7, wherein the active part of the electric linear motor is a member selected from the group consisting a primary part and a secondary part, with one of the primary and secondary parts being movable and the other one of the primary and secondary parts being stationary.

* * * * *